United States Patent
Winkler et al.

(10) Patent No.: US 11,600,990 B2
(45) Date of Patent: Mar. 7, 2023

(54) PROTECTION SYSTEM FOR PROTECTING A BATTERY SYSTEM

(71) Applicant: Intilion GmbH, Zwickau (DE)

(72) Inventors: Norman Winkler, Zwickau (DE); Thomas Nawrath, Zwickau (DE); Stefan Reinhold, Zwickau (DE)

(73) Assignee: Intilion GmbH, Zwickau (DE)

( * ) Notice: Subject to any disclaimer, the term of this patent is extended or adjusted under 35 U.S.C. 154(b) by 0 days.

(21) Appl. No.: 16/614,760

(22) PCT Filed: May 14, 2018

(86) PCT No.: PCT/EP2018/062406
§ 371 (c)(1),
(2) Date: Nov. 18, 2019

(87) PCT Pub. No.: WO2018/219625
PCT Pub. Date: Dec. 6, 2018

(65) Prior Publication Data
US 2020/0203945 A1    Jun. 25, 2020

(30) Foreign Application Priority Data
May 29, 2017 (DE) ...................... 10 2017 111 652.4

(51) Int. Cl.
*H02J 7/00* (2006.01)
*H02H 7/18* (2006.01)

(52) U.S. Cl.
CPC ............ *H02H 7/18* (2013.01); *H02J 7/0031* (2013.01); *H02J 7/00036* (2020.01); *H02J 7/00304* (2020.01)

(58) Field of Classification Search
USPC ........................................................ 320/134
See application file for complete search history.

(56) References Cited

U.S. PATENT DOCUMENTS 5,990,663 A * 11/1999 Mukainakano ....... H02J 7/0068
320/134
6,140,928 A * 10/2000 Shibuya ................ H01M 10/48
340/636.13
(Continued)

FOREIGN PATENT DOCUMENTS

EP    3079185    10/2016
EP    3101713    12/2016
(Continued)

*Primary Examiner* — Samuel Berhanu
(74) *Attorney, Agent, or Firm* — Levine Bagade Han LLP

(57) ABSTRACT

A protection system for overcurrent protection in a battery system. The protection system can have a protection element for interrupting an electric current path in the battery system. The protection system can have an acquisition unit for determining acquisition information which is specific for an electric current of the current path. The protection system can have an electronic processing unit for performing a comparison of the acquisition information with an adaptable protection specification to detect an overcurrent condition. The electronic processing unit can be operatively connected to the protection element to activate the protection element in response to the comparison such that the interruption occurs upon positive detection of the overcurrent condition in accordance with an adjustable activating characteristic.

16 Claims, 6 Drawing Sheets

10 Protection system    60 Driver unit
20 Acquisition unit     70 Protection element
21 Shunt resistor       300 Battery management system
30 Amplifier unit       E Acquisition information
40 Converter unit       I Current
50 Processing unit      P Current path

(56) References Cited

U.S. PATENT DOCUMENTS

| | | | | |
|---|---|---|---|---|
| 6,208,117 B1* | 3/2001 | Hibi | ............ | H02J 7/0031 |
| | | | | 320/134 |
| 2001/0028571 A1* | 10/2001 | Hanada | ............ | H02J 7/345 |
| | | | | 363/50 |
| 2016/0114695 A1* | 4/2016 | Holgers | ............ | B60L 3/04 |
| | | | | 701/22 |
| 2018/0069411 A1* | 3/2018 | Kim | ............ | B60L 3/0046 |
| 2019/0184834 A1* | 6/2019 | Hammerschmidt | ... | H01H 39/00 |

FOREIGN PATENT DOCUMENTS

| | | | | |
|---|---|---|---|---|
| EP | 3101713 A1 * | 12/2016 | ............ | B60L 3/0046 |
| WO | WO 2018/219625 | 12/2018 | | |

* cited by examiner

200 Battery system
210 Energy storage device
300 Battery management system
310 Semiconductor switching element
320 Monitoring unit
400 Load
P Current path 100 Method for protecting a battery system
110 Determining the acquisition information via the acquisition unit
120 Performing a comparison of the acquisition information with an adjustable protection specification
130 Activating the protection element as a function of the comparison

PROTECTION SYSTEM FOR PROTECTING A BATTERY SYSTEM

CROSS-REFERENCE TO RELATED APPLICATIONS

This application is a U.S. national application filed under 35 U.S.C. 371 to PCT International Application No. PCT/EP2018/062406, filed May 14, 2018, which claims the benefit of priority to German Patent Application No. 10 2017 111 652.4, filed May 29, 2017, the contents of each of which is incorporated herein by reference in its entirety.

BACKGROUND OF THE INVENTION

This invention relates to a protection system for the protection, in particular overcurrent protection, of a battery system. Furthermore, the invention refers to a battery system, a battery management system, and a method of protecting the battery system.

Lithium batteries (i.e. lithium-ion accumulators) are powerful accumulators with a high energy density. However, lithium batteries usually have a low internal resistance, so that enormous short-circuits or overcurrents can occur without suitable measures.

One way of preventing short circuits known from the state of the art is to use an irreversible protection, such as a fuse, as protection against overcurrents. This can be integrated into the main current path to prevent the current flow of the battery system in the event of an overcurrent. However, such a protection is relatively costly in the power classes of lithium batteries, since high switch-off capacities have to be provided. It must also be ensured that there is a sufficient distance between the normal operating current (within an operating range of the battery system) and the activating current (which activated the protection). This is made possible by selecting a protection with a suitable activating characteristic.

However, this can lead to the problem that the protection characteristic curve of the protection is not suitable for many applications. The protection characteristic curve of a fuse can have a critical range in which very high currents are required to activate the protection. There is a risk that other components in the current path may be destroyed by the high currents. In addition, the protection characteristic curve can also have a further critical area in which there is a risk of false activating. Furthermore, many types of protection have the disadvantage that they have too slow of a response time.

It is therefore an object of the present invention to at least partially eliminate the disadvantages described above. In particular, it is the object of the present invention to provide a cost-effective and/or faster and/or more efficient protection for overcurrent protection for battery systems, in particular lithium battery systems.

BRIEF SUMMARY OF THE INVENTION

The preceding object is solved by a protection system with the features of claim 1, by a battery system with the features of claim 8, by a battery management system with the features of claim 9 and by a method with the features of claim 13. Further features and details of the invention result from the respective dependent claims, the description and the drawings. Features and details which are described in connection with the inventive protection system also apply, of course, in connection with the inventive battery system, the inventive battery management system and the inventive method, and vice versa, so that with regard to disclosure, the individual aspects of the invention are or can always be mutually referred to.

The object is solved in particular by a protection system for protection, preferably for overcurrent protection, in a battery system (i.e. in particular with accumulators as rechargeable batteries):

- a (in particular irreversible) protection element for (in particular irreversible and/or at least partial) interruption of an electrical current path (in particular circuit) in the battery system,
- an acquisition unit (in particular having a shunt resistor which is integrated in the current path) for determining (at least) acquisition information which is specific at least for one electrical current of the current path, i.e. in particular enables a statement to be made about a current intensity of the electrical current which flows in the current path,
- an electronic processing unit for performing a comparison of the acquisition information with a (adaptable, optionally non-linearly or linearly adaptable and/or non-linearly or linearly or stepped) protection specification, in order preferably to detect an overcurrent state, i.e. in particular a fault state in the battery system, which, for example, indicates an (imminent) short circuit.

In particular, it is provided here that the processing unit is operatively connected (in particular electrically) to the protection element, i.e. is preferably (at least partially electrically) connected to the protection element, for example via at least one electrically conductive connection of the processing unit, in order to preferably activate the protection element in response to the comparison, so that the interruption preferably takes place in the event of positive detection of the overcurrent state in accordance with a (adaptable and/or linear or non-linear, in particular stepped) activating characteristic (of the protection system or of the protection element), in order to perform the interruption by the protection element particularly preferably in a primary and/or irreversible manner in the event of detection of the overcurrent state.

The advantage of this is that the protection system can provide a particularly powerful protection for the battery system, which enables reliable and fast activating when the overcurrent condition is detected. In particular, the performance is increased by providing an adjustable activating characteristic through the adjustable protection specification. This enables flexible and cost-effective adaptation of the protection to various applications or even to complex operating ranges of the battery system.

The protection specification is preferably adaptable and/or linear or non-linear, in particular stepped, configured, preferably in that the protection specification comprises at least one adaptable and/or linear or non-linear, in particular stepped, protection characteristic curve (for the activating currents). For example, the acquisition information here is an electrical and/or digital or analogue signal, such as a digital information or a measuring voltage, which is preferably proportional to the current intensity of the electrical current (to be measured) in the current path. Accordingly, the acquisition information can be used to detect an (existing and/or impending) overcurrent, i.e. the overcurrent condition.

The battery system preferably comprises at least one rechargeable electrical energy store, in particular a lithium accumulator (also: lithium ion battery or lithium battery), which is electrically connected via the current path (circuit)

to at least one load for energy transmission. In particular, the current path thus forms at least part of the load current circuit, and preferably the protection element (and possibly at least one semiconductor switching element) connects the energy store to the load.

An electrical energy storage device is in particular a battery, i.e. preferably a rechargeable, in particular electrochemical, energy storage device and/or a secondary battery. The energy store can thus be charged and discharged several times, whereby, for example, the chemical reactions for generating energy are reversible.

The processing unit is configured, for example, as an integrated circuit and/or as a microprocessor and/or as a microcontroller and/or the like, and is preferably provided in a battery management system.

Preferably, the processing unit may be directly or indirectly electrically connected to the registration unit. The acquisition unit preferably comprises at least one shunt resistor which is integrated in the current path. The shunt resistor can convert the current through the current path (system current) into a measuring voltage (whereby the measuring voltage drops at the resistor).

The shunt resistor can, for example, be connected to the processing unit via at least one other electronic component. The at least one further component can be, for example, an amplifier unit, in particular an amplifier circuit, and/or a converter unit, in particular an analog-to-digital converter. The amplifier unit, for example, prepares the measuring voltage so that it can be absorbed by the converter unit. Alternatively or additionally, the converter unit can also be part of the processing unit, e.g. a microcontroller. In this way, the processing unit can record and evaluate the measuring voltage. The measuring voltage and/or the output signal of the amplifier unit and/or the converter unit, for example, forms the acquisition information. In other words, the signal can form the acquisition information, which is acquired by the processing unit to evaluate the measurement voltage. The acquisition information thus includes information about the measuring voltage and thus also about the current intensity (system current) to be measured in the current path. Using a computer program (or software routines) of the processing unit, the system stream can then be compared (adjusted) with the protection specification. The comparison can be used to check predefined conditions. If these are fulfilled, i.e. the overcurrent condition is positively detected, the protection element can be activated to disconnect the battery current (e.g. from the load). For this purpose, the processing unit can be connected to the protection element (electrically) via a driver unit.

Optionally, the elements shunt resistor (shunt) and/or amplifier unit and/or processing unit and/or driver unit and/or protection element can already be present in a battery management system before the implementation of the protection system and/or provide a further additional function for battery management in addition to the function as protection system. By using such a multiple functionality, costs and installation space for the battery management system can be reduced.

It is advantageous that an adjustable (and/or linear or non-linear, in particular stepped) activating characteristic can be used, i.e. the protection system activates the protection element depending on certain conditions, which can be set and/or changed within certain limits (e.g. manually by programming and/or configuration, before and/or during operation of the battery system) if necessary. For example, the conditions are determined by adjusting the protection specification, which includes one or more customizable (configurable) protection characteristic curves. The protection characteristic curves specify, for example, at which current threshold values (i.e. activating currents) the protection element is activated. It is also conceivable that in addition to the current intenisity, other parameters are used to determine the conditions. This allows a very flexible use of the protection system as overcurrent protection.

The overcurrent condition can include a condition in which an overcurrent or a short circuit is present and/or threatens to occur. For example, in an overcurrent condition, a certain current characteristic can also be present in the permitted current range (of the operating range), which, however, is to be qualified as an overcurrent condition on the basis of predetermined criteria, which, for example, indicate an imminent overcurrent or short circuit. It is also conceivable that the overcurrent condition is detected on the basis of such complex criteria which, for example, define a certain pattern or certain characteristics in the course. Such a criterion or feature can, for example, also be specified as a (mathematical) function, to which the course of the current intensity must approach within a certain tolerance for a positive detection. Here an adjustable activating characteristic (due to the adjustable protection specification) is particularly advantageous, since even such complex relationships can be used to detect an imminent overcurrent.

A further advantage of the invention can be achieved if the processing unit is configured to activate the protection element primarily to interrupt the current path through the protection element when the overcurrent condition is detected positively by comparison. This represents a difference to a further variant, in which a different primary protection is activated primarily when an overcurrent condition is detected, and the protection element is activated only secondarily (redundantly), e.g. in the event of a primary protection fault. On the other hand, the primary activating of the protection element has the advantage that in a critical situation of the battery system, such as the overcurrent state, the current path can be interrupted with a shorter (faster) response time and more reliably. This means that an additional fuse can be dispensed with for this purpose.

It is also conceivable that the protection element is configured as an irreversible protection element so that the protection element can only be activated irreversibly by the processing unit to stop the electrical current. This enables a reliable and permanent prevention of the current flow.

In the context of the invention, the term "irreversible" or "irreversibly activatable" refers in particular to the fact that (only) a pulse-like initiation current or energy shock is necessary in order to bring the protection element from a closed to a permanently open (activated) switching state (and thus to effect the activating). This activation can, for example, be caused by the processing unit by the processing unit controlling a driver unit which activates and/or provides the initiation current or energy shock to the protection element. In particular, the protection element can remain stable in the open, activated switching state after the power supply (initiation current) has been omitted. This has the advantage that only a small amount of energy is required to switch the protection element. Even after the loss of energy supply, it is guaranteed that the circuit is interrupted and/or the current flow is interrupted.

The term "irreversible" thus refers in particular to an electrical or electrically controlled switch with a stable switching state. The protection element can thus be configured as a pyrotechnic switch and/or as a bistable relay, for example. Accordingly, the protection element may only be configured for one-time switching (activating), so that the protection element prevents the circuit from closing again (whereas this is possible with "reversible" switching).

Optionally, it may be provided that the protection specification is implemented as digitally stored information and is preferably implemented as adaptable, in particular programmable, depending on at least one parameter of the battery system, the adaptation preferably taking place linearly or non-linearly or in stages. This has the advantage that a flexible adjustment of the protection system is possible. In this case, the protection specification can be stored digitally in a non-volatile data memory of the battery system, preferably the battery management system, preferably the processing unit. The adjustment can be done manually or automatically (also during operation of the battery system). Preferably at least one parameter may include at least one of the following parameters:

- at least one characteristic of a semiconductor switching element of a battery management system, in particular a characteristic variable, preferably a short-circuit resistance, so that the activating characteristic is adapted to the characteristic,
- at least one temperature in the battery system and/or the environment such that the activating characteristic is adapted to the temperature,
- an application mode of the battery system and/or battery management system so that the activating characteristics are adapted to specific applications,
- an operating time of the battery system.

For this purpose, the registration unit may be configured to register at least one of the said parameters, and/or at least one further registration unit may be provided for this purpose.

Furthermore, it is conceivable that the protection specification comprises at least one protection characteristic curve which is specific for the activating characteristic of the protection system and which is preferably variably adaptable to an operating range of the battery system, preferably manually by programming and/or configuring the processing unit. Preferably, the protection characteristic curve has a linear or non-linear or stepped curve in order to effect the linear or non-linear or stepped adjustment. For example, the protection characteristic curve comprises a value or different values for activating currents (activating current intensities), for example as a function of at least one further parameter of the battery system, such as an operating time or a temperature or the like. In other words, the protection characteristic curve can specify which activating current is used for which parameter values, i.e. in particular the overcurrent condition is detected positively. Also, with a linear protection characteristic curve, only a fixed (constant) value can be provided for the activating current, also for different values of the other parameter such as the operating time, in order to guarantee stability with a corresponding operating range. The activating current is, for example, the current intensity which must be reached by the current through the current path so that the fault condition, in particular the overcurrent condition, is positively detected. This can be determined by comparison by the processing unit.

The operating range comprises, for example, at least one permissible value range (or different permissible value ranges) of at least one parameter of the battery system in which a normal state (i.e. in particular no overcurrent state) is present. For example, there may also be several permissible value ranges which are linked to certain conditions (e.g. depending on an operating time or a temperature of the battery system). For example, the permissible value ranges can, if necessary, only be determined on the basis of complex regulations, which may take several parameters into account. This is due to the fact that the permissible value ranges can also change during operation and/or depending on the parameters (such as the battery system and/or ambient temperature and/or the characteristics of the components used in the battery system and in particular the battery management system). The adaptable (variable) protection characteristic curve therefore has the advantage that the protection system and the activating characteristic can be adapted to the operating range (which may include self-adjustable permissible value ranges), e.g. for different operating times or different components. If the permissible value ranges are undershot and/or exceeded, an error condition, in particular an overcurrent condition, may be present.

Furthermore, it is conceivable within the scope of the invention that the protection specification comprises a plurality of adaptable protection characteristic curves which can preferably be adapted to an operating range of the battery system in different ways from one another, in particular in order to perform the positive detection of the overcurrent state for a plurality of value ranges and/or parameters of the operating range by comparison with the respective protection characteristic curves. In other words, the activating characteristic can be adapted (approximated) to the (complex) operating range by individual adaptation of the protection characteristic curves. In particular, this means that at least one protection characteristic curve can be provided for one parameter and/or value range at a time. For example, several value ranges are provided, which for different operating modes (applications) include different current ranges in which normal operation (normal state) is present. Accordingly, the protection characteristic curves can be adapted to these ranges, and if necessary also non-linearly or stepwise or linearly adapted, so that exceeding the protection characteristic curves (i.e. e.g. the activating currents provided thereby by the measured amperage or by the acquisition information on the amperage) causes the positive detection. Other parameters such as operating time, voltage, state of charge or temperature of the battery system can also be taken into account.

For example, in the comparison, the detected (measured) current intensity provided by the acquisition information can be compared with a threshold value (e.g. activating current intensity) provided by the protection specification. If the current intensity then exceeds the threshold value, this can cause positive detection (e.g. of the overcurrent state). Several threshold values can also be provided in the protection specification, where, for example, a current (measured) value of at least one of the other parameters determines which threshold value is taken into account for the comparison. For this decision, you can also compare the value of the other parameter with a threshold value (for example, the protection specification).

It may be advantageous if, within the scope of the invention, the protection element is configured as a pyrotechnic switch and can preferably be activated by igniting an explosive charge from the pyrotechnic switch. After activation, the pyrotechnic switch exhibits a stable and irreversible switching state. In this context, the term "irreversible" refers in particular to the fact that after the protection element has been activated, the functionality of the fuse element for switching is irreversibly destroyed so that it is impossible for the protection element, in particular the pyrotechnic switch, to re-close the circuit (of the energy storage device). The pyrotechnic switch or protection element is preferably configured as an isolating switch, which enables complete galvanic isolation of the circuit. A driver unit can preferably be provided and electrically connected to the protection element to control the protection element. The driver unit generates a surge of energy, in particular an ignition current, which activates the protection element. The energy impact causes, for example, the activating of a blasting unit of the protection element, which is configured in particular as a pyrotechnic switch, whereby a bolt is driven through a perforated conductor. In particular, the conductor is an electrical conductor which is connected to the contacts of the protection element in such a way that it is part of the circuit of the battery system.

In particular, it is foreseen that the activation of the explosive unit or the activation of the protection element will interrupt the current flow through the current path or conductor, thereby also preventing the current flow of the circuit of the battery system and/or irreparably interrupting the circuit. To close the circuit again after the protection element has been activated, it may be necessary to replace the protection element. The protection element is therefore particularly integrated into the circuit of the battery system in such a way that the conductor or the contacts of the protection element form part of the circuit and close it in the deactivated switching state of the protection element and open it in the activated switching state. The advantage here is that an electrical power for ignition only has to be applied in the switching case for activation. In normal operation there is therefore no and/or only a low power consumption of the pyrotechnic switch. A low current consumption is thus ensured by the fact that only in the case of activation, i.e. in the case of switching, an (essential) electrical power must be applied for ignition. The pyrotechnic switch is inexpensive and also has a high current carrying capacity, as the contacts are form and/or positively fitted connection before ignition.

The invention also relates to a battery system, in particular a lithium battery system. Here it is preferably provided that the battery system comprises at least one rechargeable energy store, preferably at least one lithium battery (lithium accumulator), which can be connected to a load (consumer) via an electrical current path. Furthermore, the battery system may comprise at least one battery management system which serves at least to monitor and/or control a current flow of the current path. In addition, the battery system may include an electronic protection system (in particular electronic overcurrent protection device) for overcurrent protection of the battery system, in particular a protection system as invented, preferably as an electronic overcurrent protection device. The battery system according to the invention thus has the same advantages as those described in detail with reference to a protection system according to the invention.

The battery system shall preferably comprise at least one or more cells and/or one or more cell packs. The battery system preferably has at least one cell pack with at least 8 cells and/or a maximum of 16 cells and/or a maximum of 24 cells. By interconnecting the cells, a particularly simple and cost-effective scaling of the battery system is possible. The battery system, in particular as a rechargeable battery system, preferably has at least one rechargeable energy store. In a lithium (ion) battery system, at least one rechargeable lithium battery is provided as energy storage. The maximum output voltage and/or open circuit voltage and/or nominal voltage of the battery system is e.g. 12 V and/or 26 V and/or 50 V maximum. Furthermore, the nominal voltage of the individual cells is in the range of 2 to 5 V, in particular 2.9 to 3.7 V.

Another embodiment of the invention is an (electronic) battery management system for monitoring and controlling a battery system, in particular a battery system according to the invention:
- at least one semiconductor switching element, preferably at least one power semiconductor switch, for controlling a current flow in the battery system,
- at least one electronic protection system, e.g. as an electronic overcurrent protection device, in particular a protection system in accordance with the invention, for the detection of a fault condition, in particular an overcurrent condition, in the battery system.

In particular, it is provided here that a positive detection of the fault state or overcurrent state (in particular primary) can activate a protection element of the protection system to (in particular irreversible) prevent the current flow. Thus, the battery management system according to the invention has the same advantages as those described in detail with reference to a protection system and/or battery system according to the invention.

It is further conceivable that a monitoring unit is provided in the battery management system according to the invention in order to detect a malfunction in the protection system of the battery management system, so that preferably in the event of positive detection of the malfunction the battery system can be converted into a safe state, preferably by activation of the at least one semiconductor switching element for preventing the current flow. For this purpose, the monitoring unit is electrically connected, for example, to the processing unit and/or to the acquisition unit and/or to a further acquisition unit in order to monitor the battery system and detect the malfunction. The monitoring unit can also be connected to other components of the battery management system, such as battery management system electronics, to drive the semiconductor switching element. This enables the interruption of the current flow in the event of a malfunction of the protection system. It may also be possible that functional safety methods are implemented in the protection system.

Advantageously, the invention may provide that only the electronic protection system is intended for overcurrent protection by irreversibly preventing the current flow. In other words, it may be possible for the battery management system to use only the protection system as an electronic protection, and thus dispense with a fuse or the like. This means that installation space and costs can also be reduced, as e.g. a protection holder, rails and/or other fastening means for the fuse can be saved.

Another embodiment of the invention is a method for protection in a battery system, in particular for overcurrent protection, with a protection element, an acquisition unit and an electronic processing unit.

In particular, it is provided here that at least one of the following steps is performed, preferably the steps being performed one after the other or in any order, preferably individual steps also being able to be performed repeatedly:
- acquisition information by the acquisition unit, the acquisition information being specific for an electric current at an electric current path in the battery system (e.g. the acquisition information is a measurement voltage from a shunt resistor which may be amplified and/or converted into digital information),
- a method for detecting an error condition, in particular an overcurrent condition, comprising the steps of: performing by the processing unit a comparison of the acquisition information with an adaptable protection specification so that an error condition, in particular an overcurrent condition, is detected, wherein preferably for the comparison the acquisition information is evaluated digitally and/or numerically by the processing unit, for example by means of a computer program, the protection element (in particular initiated by the processing unit) is activated as a function of the comparison so that the electrical current path (through the protection element) is interrupted in the event of positive detection of the fault condition, in particular overcurrent condition, in accordance with an adjustable activating characteristic.

Thus, the inventive method has the same advantages as those described in detail in relation to an inventive protection system and/or an inventive battery system and/or an inventive battery management system. In addition, the method may be suitable to operate a protection system and/or battery system and/or battery management system in accordance with the invention.

It is further conceivable that the acquisition information is specific for a temporal course of the electric current and in particular comprises a plurality of current intensity values, wherein features and/or patterns of the course are preferably evaluated on the basis of the acquisition information during the performance of the comparison in order to detect an error state, in particular an overcurrent state. For this purpose, the acquisition information can include, for example, several values which represent a current intensity curve of the current through the current path (of the load circuit). Alternatively or additionally, the acquisition information may also include values specific to a course of at least one other parameter of the battery system (such as a temperature course, operating time or the like). To record the operating time, the recording unit and/or a further recording unit may be provided, which, for example, comprises a timer module or a timer or the like. In particular, it is assumed that at least a certain course indicates a short circuit or the like, so that in this case the fault condition or overcurrent condition is to be detected. Preferably, the processing unit can be used to detect certain features in the course or in the acquisition information, such as a pattern and/or a defined current (course) and/or a certain signature and/or certain threshold values. The protection specification can also include at least one template progression with which the acquisition information is compared. One advantage of the inventive protection system or the inventive process is that the relevant parameters can be specified almost arbitrarily. In contrast to a fuse, it is not necessary to wait for the melting of the protection, but the protection can be activated at a defined current in a defined time. Since there is no need to wait for thermal melting, especially with the protection element (in contrast to the fuse), the circuit can be disconnected even at lower currents. Due to this fast separation, a short-circuit current can be detected, especially during the initial phase (the so-called "bounce"). This allows the current flow to be interrupted before the short-circuit current has completely built up. In other words, it is advantageous for the processing unit to detect the fault condition, in particular the overcurrent condition, when the first "signs" of a short circuit or the like occur, which can be detected, for example, on the basis of the course or the acquisition information.

Advantageously, in the invention, it may be provided that the acquisition information is evaluated and/or compared in performing the comparison according to predetermined comparison criteria in order to determine at least one characteristic feature of a course of electric current specific to an overcurrent state. The characteristic is, for example, a certain course (like a rise or a certain function, which is approximated by the course). This enables detection of an incipient short-circuit current or the like and thus activate the protection at an early stage. The comparison and/or the comparison criteria can be provided, for example, by a digital specification and/or by an algorithm, such as a statistical algorithm and/or pattern recognition.

The invention may preferably provide that the protection specification is adapted to an operating range of the battery system (in particular linear or non-linear or stepped), so that preferably at least one threshold value of a current intensity of the electric current (as activating current) is defined, at which the interruption of the electric current path is provided. in particular, the interruption of the current path can take place in a defined time by activation of the protection element. For example, if the threshold value is exceeded, the interruption can take place in order to provide reliable protection. This possibility of using threshold values can be combined with a previously described method in which further comparison criteria are used and/or the course is evaluated.

Further advantages, features and details of the invention result from the following description, in which embodiments of the invention are described in detail with reference to the drawings. The features mentioned in the claims and in the description may be essential to the invention either individually or in any combination. It is shown:

BRIEF DESCRIPTION OF THE SEVERAL
VIEWS OF THE DRAWINGS

DETAILED DESCRIPTION OF THE
INVENTION

In the following figures, the identical reference signs are used for the same technical characteristics, even for different embodiments.

Figure 1:
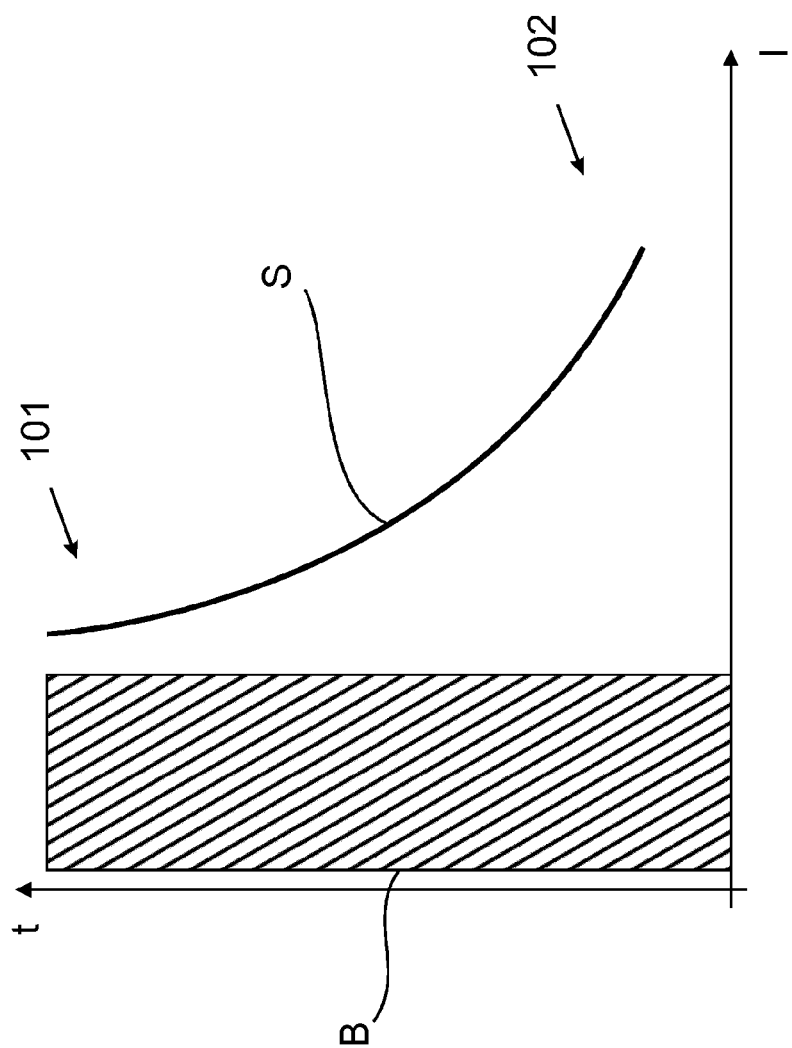
FIG. 1 illustrates a schematic representation of a protection specification.
Figure 2:
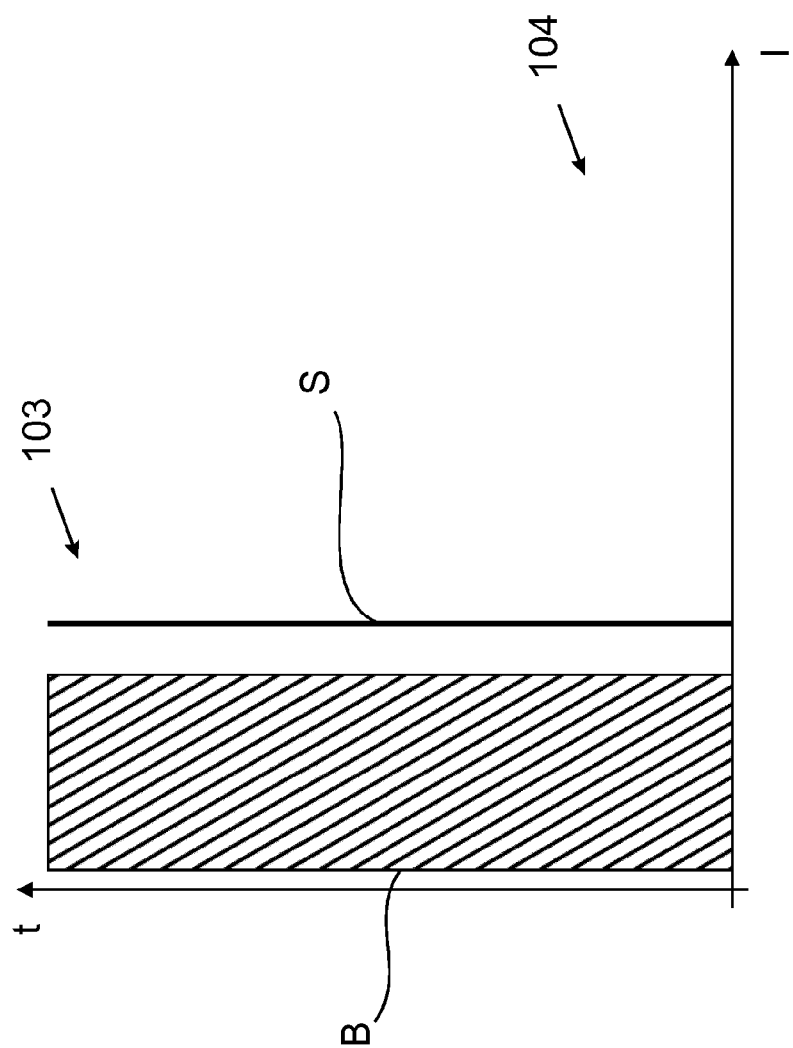
FIG. 2 illustrates another schematic representation of another protection specification.
Figure 3:
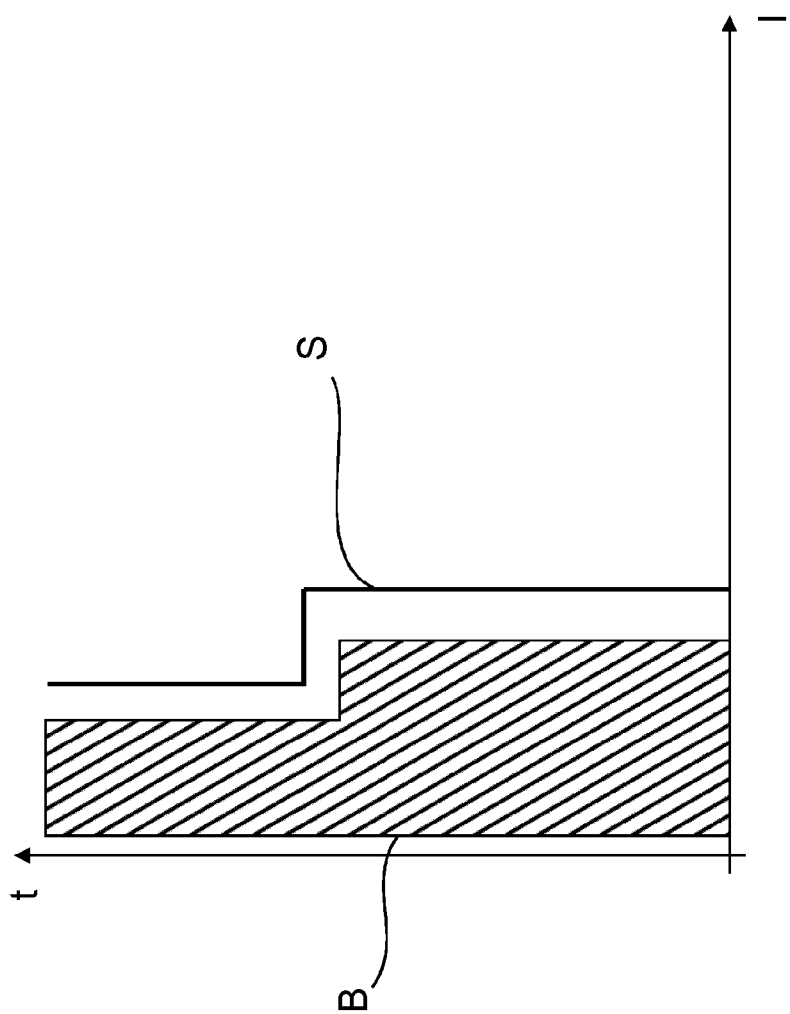
FIG. 3 illustrates another schematic representation of another protection specification.

FIGS. 1 to 3 schematically show different protection specifications S, in particular protection characteristic curves S. Here the activation behavior or the activating current S (with current intensity I) of the protection element 70 for different operating times t of a battery system 200 is shown as an example. Thus, the relationships presented are specific to a particular exemplary activating characteristic of a protection system 10 according to the invention. The area highlighted with a hatch corresponds to an exemplary operating range B of a battery system 200. In this case, the operating range B comprises current value ranges in which normal operation of the battery system 200 is present, i.e. in which the protection is not to be activated.

FIG. 1 shows a typical characteristic curve, which can also be present with a conventional fuse. A first critical area 101 is shown, in which there is a danger of false activation of the protection in continuous operation. In addition, a second critical area 102 is shown in which very high currents are required to activate the protection. There is a danger of destroying other components in the current path.

This problem can at least be reduced if other protection specifications S are used. FIG. 2 shows an improved characteristic curve with a sufficient distance to the normal operating range B in a first range 103 and a sufficient proximity to the operating range B in a second range 104 to prevent high currents. In FIG. 2, the protection specification S or protection characteristic curve S is linear.

A further improvement is shown in FIG. 3, in which a protection specification S is used, which is non-linearly adapted to operating range B, in particular in steps. The operating range B comprises at least two different value ranges for permissible values (e.g. a current intensity).

Figure 4:
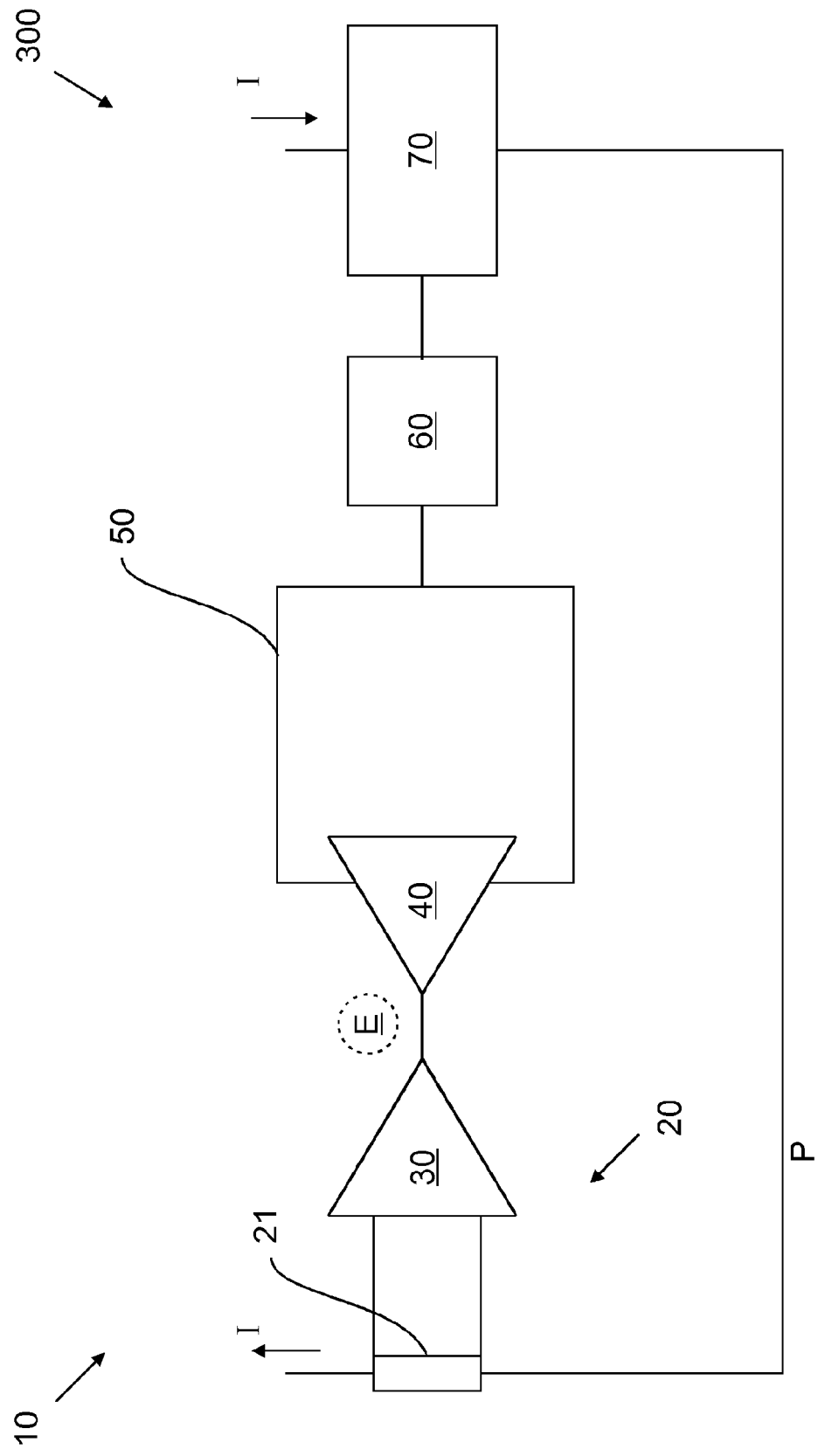
FIG. 4 illustrates a schematic representation of an inventive protection system and an inventive battery management system.

FIG. 4 schematically shows a battery management system 300 according to the invention with a protection system 10 according to the invention. Here the current path P through which an electric current I flows is shown in part, in particular between an energy storage device 210 and a load 400. A acquisition unit 20 is provided to detect this current I. The current path P is shown in the diagram below. The acquisition unit 20 uses a shunt resistor 21, which is integrated in the current path P, for this purpose. The voltage drop at the shunt resistor 21 can be used to determine a measuring voltage which is proportional to current I. The voltage drop at the shunt resistor 21 can be used to determine a measuring voltage which is proportional to current I. This measuring voltage is amplified by an amplifier unit 30 and converted into a digital signal by a converter unit 40, in particular an analog-to-digital converter 40. In this way, the acquisition information E can be determined, which, for example, is formed by the amplified measuring voltage and/or by the digitally converted measuring voltage. It is crucial that the acquisition information E includes information on the parameter acquired, i.e. in the example of current intensity shown in FIG. 4. The acquisition information E can also include a curve of the values of the parameter, such as the current. For example, the measuring voltage can be recorded at several points in time, and the measured values determined here can be temporarily stored as a temporal course. The acquisition information E can then be evaluated by a processing unit 50, such as a microcontroller. Depending on this evaluation, a driver unit 60 can then be controlled by the processing unit 50, which then activates the protection element 70. This interrupts the current path P.

Figure 5:
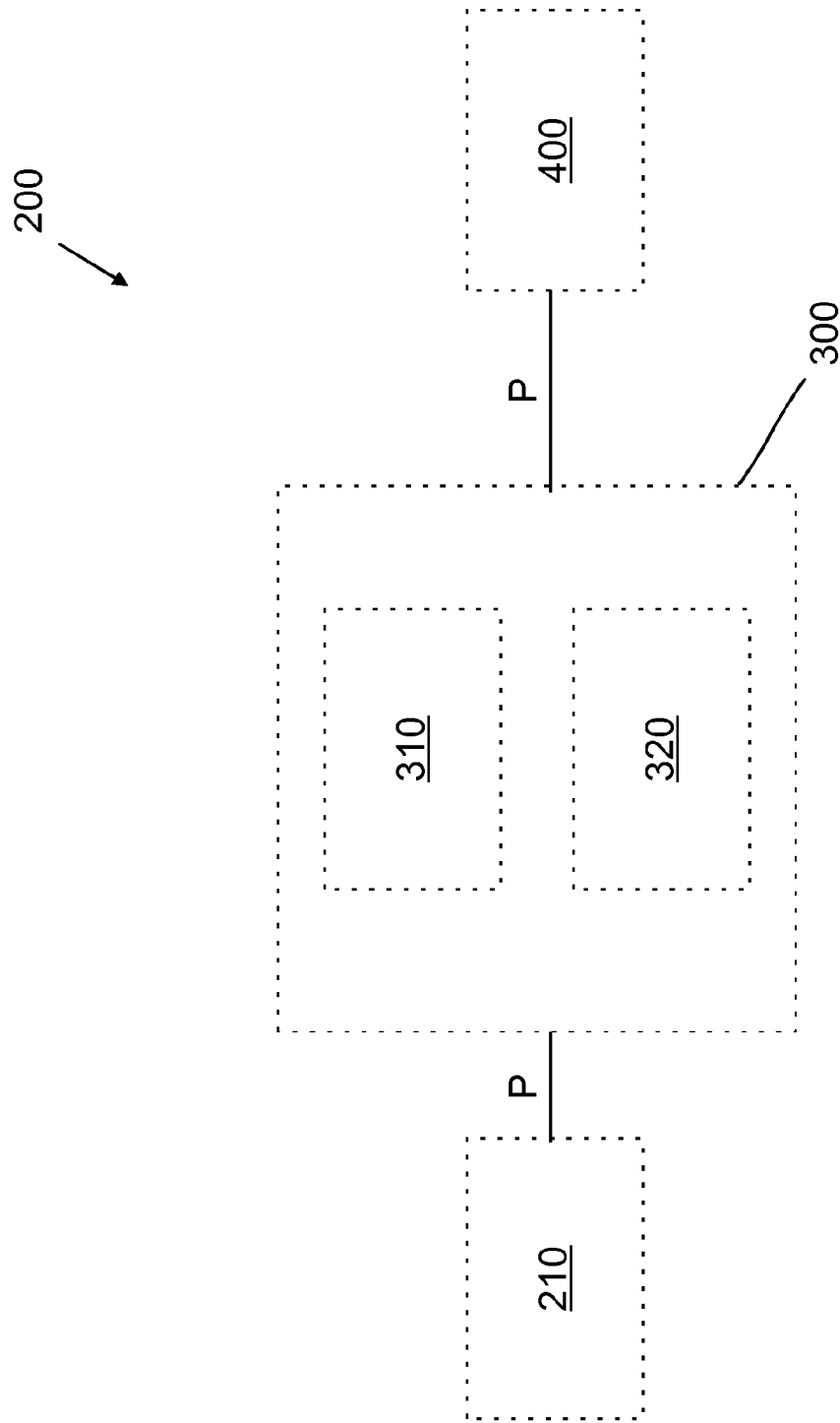
FIG. 5 illustrates a schematic representation of a battery system according to the invention.

FIG. 5 schematically shows a battery system 200. This comprises in particular at least one energy storage 210, which is connected via the current path P to a battery management system 300 of the battery system 200. For example, the battery management system 300 comprises at least one semiconductor switching element 310 and/or at least one monitoring unit 320. The battery management system 300 also connects the energy storage 210 to a load 400.

Figure 6:
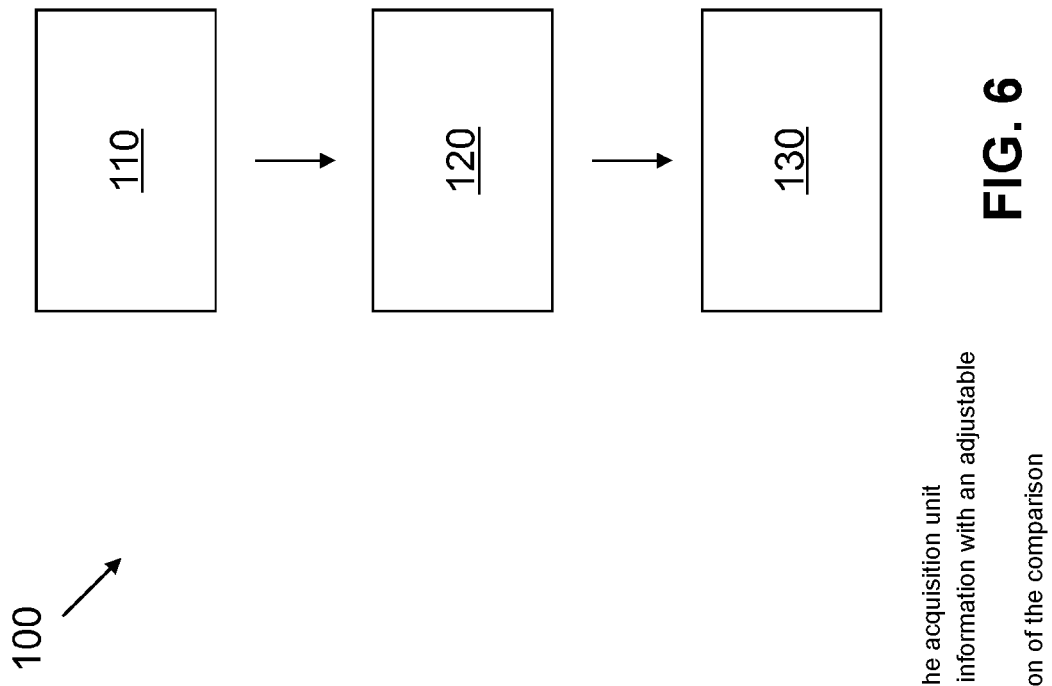
FIG. 6 illustrates schematic representation for the visualization of a method according to the invention.

FIG. 6 schematically visualizes a method 100 according to the invention. According to a first method step 110, acquisition information E is determined by the acquisition unit 20, whereby the acquisition information E is specific for an electric current I with an electric current path P for the battery system 200. In a second method step, step 120, the processing unit 50 performs a comparison of the acquisition information E with an adjustable protection specification S so that an overcurrent condition is detected. Subsequently, in accordance with a third method step 130, the protection element 70 can be activated as a function of the comparison, so that the electrical current path P is interrupted if the overcurrent state is detected positively in accordance with an adjustable activating characteristic.

The preceding explanation of the embodiments describes the present invention exclusively in the context of examples. Of course, individual features of the embodiments can be freely combined with each other, if technically reasonable, without leaving the scope of the present invention.

REFERENCE CHARACTER LIST

10 Protection system
20 Acquisition unit
21 Shunt resistor
30 Amplifier unit
40 Converter unit, analog-to-digital converter
50 Processing unit
60 Driver unit
70 Protection element, pyrotechnic switching element
100 Methods
101 First critical area
102 Second critical area
103 First area
104 Second area
110 First method step
120 Second method step
130 Third method step
200 Battery system
210 Energy storage device
300 Battery management system
310 Semiconductor switching element
320 Monitoring unit
400 Load
t Time
B Operating range
E acquisition information
I Current
P Current path
S Protection specification, protection characteristic curve

The invention claimed is:

1. A protection system for overcurrent protection in a battery system, with:
    a protection element for interrupting an electric current path in the battery system,
    an acquisition unit for determining acquisition information which is specific for an electric current of the electric current path,
    an electronic processing unit for performing a comparison of the acquisition information with an adjustable protection specification to detect an overcurrent condition,
    wherein the electronic processing unit is operatively connected to the protection element for activating the protection element in response to the comparison such that the interruption occurs upon positive detection of the overcurrent condition in accordance with an adjustable activating characteristic,
    wherein the adjustable protection specification comprises a plurality of adaptable protection characteristic curves which are adaptable to an operating range of the battery system in different ways from one another in order to perform the positive detection of the overcurrent condition at least for a plurality of value ranges or parameters of the operating range by comparison with the respective protection characteristic curves, wherein the protection element is configured as a pyrotechnic switch, whereby a bolt is driven through a perforated conductor, wherein the conductor is an electrical conductor which is connected to contacts of the protection element such that the electrical conductor is part of a circuit of the battery system.

2. The protection system according to claim 1, wherein the electronic processing unit is configured to activate the protection element primarily upon positive detection of the overcurrent condition based on the comparison in order to interrupt the electric current path through the protection element.

3. The protection system according to claim 1, wherein the protection element is configured as an irreversible protection element so that the protection element is only activatable irreversibly to prevent the electric current from being interrupted by the electronic processing unit.

4. The protection system according to claim 1, wherein the protection specifications are executed as digitally stored information and is executed in an adaptable manner as a function of at least one parameter of the battery system.

5. The protection system according to claim 1, wherein the adjustable protection specification comprises at least one protection characteristic curve which is specific for the activating characteristic of the protection system, and which is variably adaptable to an operating range of the battery system, preferably at least manually by programming or configuring the electronic processing unit.

6. A battery system with:
at least one rechargeable energy store device-which is configured to be connectable-to a load via an electric current path,
at least one battery management system at least for monitoring a current flow of the electric current path, and
an protection system according to claim 1 for overcurrent protection in the battery system.

7. A battery management system for monitoring and controlling a battery system, comprising:
at least one semiconductor switching element for controlling a current flow in the battery system,
at least one protection system according to claim 1 for detecting an overcurrent condition in the battery system,
wherein, upon positive detection of the overcurrent condition, primarily a protection element of the protection system is configured to be activated for irreversibly preventing the current flow.

8. The battery management system according to claim 7, wherein a monitoring unit is provided in order to detect a malfunction in the protection system so that, if the malfunction is detected positively, the battery system is convertible into a safe state, preferably by activation of the at least one semiconductor switching element in order to prevent the current flow.

9. The battery management system according to claim 7, wherein only the protection system is provided for overcurrent protection by irreversibly preventing the current flow.

10. The battery management system according to claim 7, wherein the protection system is implemented for overcurrent protection in a battery system, with:
a protection element for interrupting an electric current path in the battery system,
an acquisition unit for determining acquisition information which is specific for an electric current of the electric current path,
an electronic processing unit for performing a comparison of the acquisition information with an adjustable protection specification to detect the overcurrent condition, wherein the electronic processing unit is operatively connected to the protection element for activating the protection element in response to the comparison such that the interruption occurs upon positive detection of the overcurrent condition in accordance with an adjustable activating characteristic.

11. A method for protection in a battery system having a protection system according to claim 1 where the following steps are performed:
detecting an acquisition information by the acquisition unit, the acquisition information being specific for an electric current at an electric current path in the battery system,
performing by the electronic processing unit a comparison of the acquisition information with an adaptable protection specification such that an overcurrent condition is detected,
activating the protection element in response to the comparison so that the electric current path is interrupted in the event of positive detection of the overcurrent condition in accordance with an adjustable activating characteristic.

12. The method according to claim 11, wherein the acquisition information is specific for a temporal characteristic of the electric current.

13. The method according to claim 11, wherein the acquisition information is at least evaluated or compared during the execution of the comparison in accordance with predetermined comparison criteria in order to determine at least one characteristic feature of a curve of the electric current which is specific for the overcurrent condition.

14. The method according to claim 11, wherein the adaptable protection specification is adapted to an operating range of the battery system so that at least one threshold value of a current intensity of the electric current is defined, at which the interruption of the electric current path is provided.

15. The method according to claim 11,
wherein the electronic processing unit is operatively connected to the protection element for activating the protection element in response to the comparison such that the interruption occurs upon positive detection of the overcurrent condition in accordance with an adjustable activating characteristic or a battery system with at least one rechargeable energy store device, is configured to be connectable to a load via an electric current path, at least one battery management system at least for monitoring a current flow of the electric current path,
wherein the protection system for overcurrent protection in the battery system or the at least one battery management system for monitoring and controlling a battery system comprises:
at least one semiconductor switching element for controlling a current flow in the battery system,
at least one electronic protection system for detecting an overcurrent condition in the battery system,
wherein, upon positive detection of the overcurrent condition, primarily a protection element of the protection system is activated for irreversibly preventing the current flow is operated.

16. The method according to claim 11, wherein the acquisition information comprises at least a plurality of current values, features or patterns of the characteristic being evaluated in order to detect an overcurrent condition state when the comparison is performed using the acquisition information.

* * * * *